(12) United States Patent
Asaro et al.

(10) Patent No.: US 10,509,666 B2
(45) Date of Patent: Dec. 17, 2019

(54) REGISTER PARTITION AND PROTECTION FOR VIRTUALIZED PROCESSING DEVICE

(71) Applicant: ATI Technologies ULC, Markham (CA)

(72) Inventors: Anthony Asaro, Markham (CA); Yinan Jiang, Markham (CA); Kelly Donald Clark Zytaruk, Markham (CA)

(73) Assignee: ATI TECHNOLOGIES ULC, Markham, Ontario (CA)

( * ) Notice: Subject to any disclaimer, the term of this patent is extended or adjusted under 35 U.S.C. 154(b) by 141 days.

(21) Appl. No.: 15/637,810

(22) Filed: Jun. 29, 2017

(65) Prior Publication Data

US 2019/0004840 A1 Jan. 3, 2019

(51) Int. Cl.
| | |
|---|---|
| *G06F 9/46* | (2006.01) |
| *G06F 9/455* | (2018.01) |
| *G06F 9/48* | (2006.01) |
| *G06F 9/38* | (2018.01) |
| *G06F 21/74* | (2013.01) |
| *G06F 13/372* | (2006.01) |
| *G06F 21/53* | (2013.01) |

(52) U.S. Cl.
CPC ........ *G06F 9/45558* (2013.01); *G06F 9/3851* (2013.01); *G06F 9/4843* (2013.01); *G06F 13/372* (2013.01); *G06F 21/53* (2013.01); *G06F 21/74* (2013.01); *G06F 2009/45583* (2013.01)

(58) Field of Classification Search
CPC .... G06F 9/45558; G06F 13/372; G06F 21/74; G06F 9/4843; G06F 9/3851
See application file for complete search history.

(56) References Cited

U.S. PATENT DOCUMENTS

| | | | | | |
|---|---|---|---|---|---|
| 5,895,503 | A | * | 4/1999 | Belgard | G06F 12/1036 711/200 |
| 8,060,713 | B1 | * | 11/2011 | Natanzon | G06F 17/30368 711/162 |
| 2002/0078314 | A1 | * | 6/2002 | Hornung | G06F 11/1048 711/154 |
| 2003/0065933 | A1 | * | 4/2003 | Hashimoto | G06F 21/123 713/194 |
| 2007/0266053 | A1 | * | 11/2007 | Ahal | G06F 11/1471 |
| 2008/0086729 | A1 | * | 4/2008 | Kondoh | G06F 9/5077 718/1 |
| 2008/0201336 | A1 | * | 8/2008 | Yamato | G06F 17/30067 |

(Continued)

*Primary Examiner* — Adam Lee
(74) *Attorney, Agent, or Firm* — Volpe and Koenig, P.C.

(57) ABSTRACT

A register protection mechanism for a virtualized accelerated processing device ("APD") is disclosed. The mechanism protects registers of the accelerated processing device designated as physical-function-or-virtual-function registers ("PF-or-VF* registers"), which are single architectural instance registers that are shared among different functions that share the APD in a virtualization scheme whereby each function can maintain a different value in these registers. The protection mechanism for these registers comprises comparing the function associated with the memory address specified by a particular register access request to the "currently active" function for the APD and disallowing the register access request if a match does not occur.

32 Claims, 5 Drawing Sheets

(56) References Cited

U.S. PATENT DOCUMENTS

| | | | |
|---|---|---|---|
| 2015/0089495 A1* | 3/2015 | Persson | G06F 9/45558 718/1 |
| 2016/0077984 A1* | 3/2016 | Steinert | G06F 13/1642 710/309 |
| 2017/0109165 A1* | 4/2017 | Batley | G06F 9/30043 |

* cited by examiner

REGISTER PARTITION AND PROTECTION FOR VIRTUALIZED PROCESSING DEVICE

BACKGROUND

Computer virtualization is a technique in which a single set of hardware is shared among different virtual instances of a computer system. Each instance—a virtual machine ("VM")—believes that it owns a whole, hardware computer system, but in reality, the hardware resources of a computer system are shared, through various virtualization techniques, among the different VMs. Advances in virtualization, including advances in virtualization for devices other than the CPU, system memory, and the like, are constantly being made.

BRIEF DESCRIPTION OF THE DRAWINGS

A more detailed understanding can be had from the following description, given by way of example in conjunction with the accompanying drawings wherein.

DETAILED DESCRIPTION

A register protection mechanism for a virtualized accelerated processing device ("APD") is disclosed. The mechanism protects registers of the accelerated processing device designated as physical-function-or-virtual-function registers ("PF-or-VF* registers"—where the asterisk indicates that the registers are for a plurality of virtual functions (such as all virtual functions)), which are registers that have a single architectural instance but are shared among different virtual machines. Virtualization platforms have the capability to support multiple VMs where each VM is designated as either a host VM or a guest VM. Typically, there is only one host VM and the host VM has very broad permissions in comparison to a guest VM. There are typically many guest VMs per single host VM. The VMs have the ability to share the APD in a virtualization scheme, where each virtual machine has the capability to be assigned zero, one, or more virtual functions. In some examples, the APD is time-shared among different virtual functions, and optionally, a physical function. An APD peripheral component interconnect express ("PCIe") virtual function ("VF") is a lightweight PCIe function that supports single root input-output virtualization ("SR-IOV"). Each VF is associated with a PCIe physical function ("PF") on the APD and represents a lightweight virtualized instance of the APD. Zero, one, or more virtual functions can be associated with a VM. A physical function can be associated with either a guest or a host virtual machine that will provide privileged access to virtualization-related or other aspects of the APD. PF-or-VF* registers are registers of the APD for which only a single "architectural" version of the register exists, but for which this single register is shared among different functions via a backup-and-restore mechanism in which, when a new function is to use the APD, the register values for the current function are saved in a register save buffer and the register values for the new function are restored to the architectural registers. When the backup registers for the new function have been restored to the architectural registers, the new function becomes the "active" function. The protection mechanism for these registers comprises comparing the function associated with the memory address specified by a particular register access request to the "currently active" function for the APD and disallowing the register access request if a match does not occur.

Figure 1:
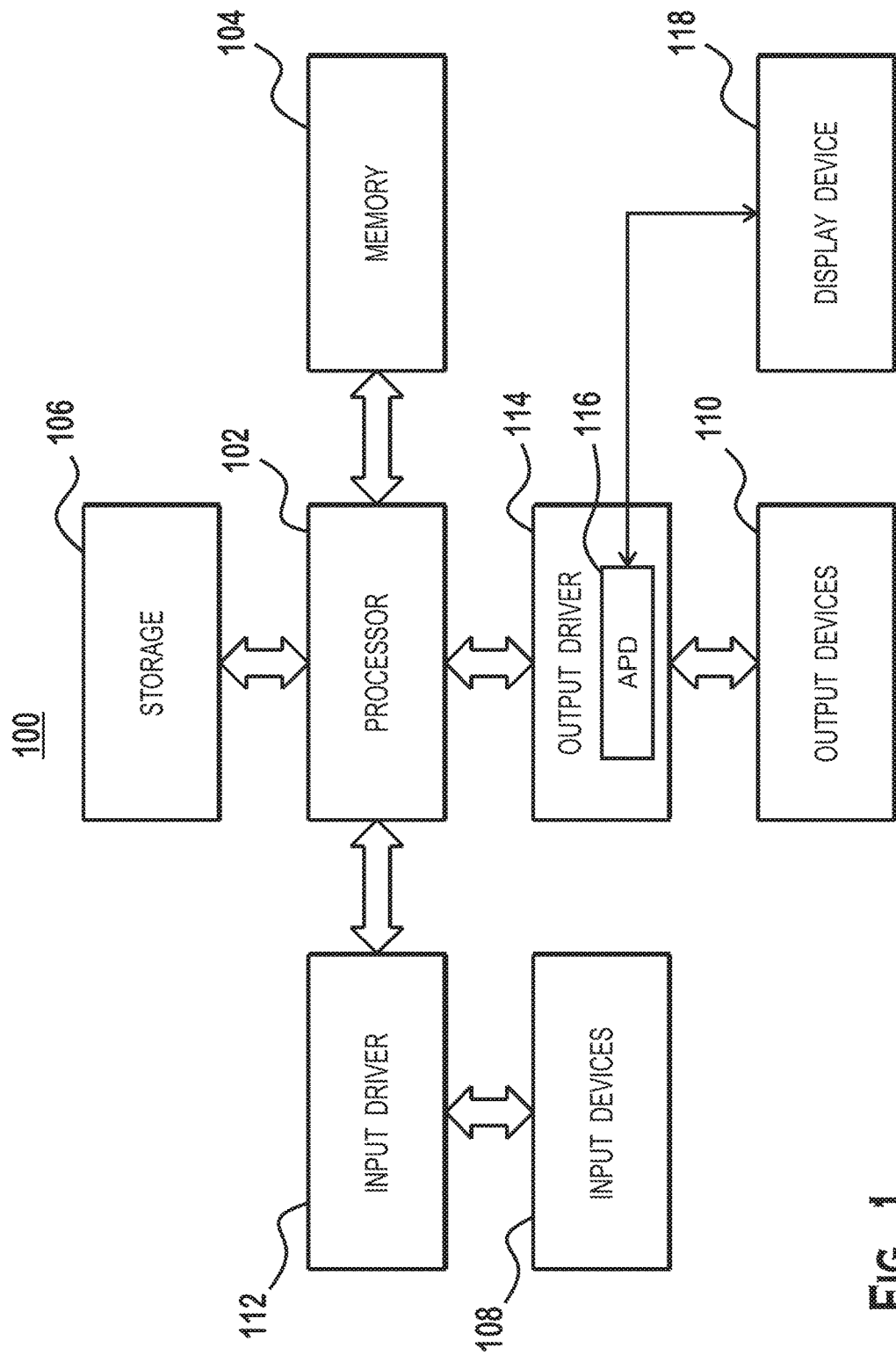
FIG. 1 is a block diagram of an example device in which one or more features of the disclosure can be implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 114 includes an accelerated processing device ("APD") 116 which is optionally coupled to a display device 118, which, in some examples, is a physical display device or a simulated device that uses a remote display protocol to show output. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

The processor 102 is configured to support a virtualizations scheme in which multiple virtual machines execute on the processor 102. Each virtual machine ("VM") "appears" to software executing in that VM as a completely "real" hardware computer system, but in reality comprises a virtualized computing environment that may be sharing the device 100 with other virtual machines. Virtualization may be supported fully in software, partially in hardware and partially in software, or fully in hardware. The APD 116 supports virtualization, meaning that the APD 116 can be shared among multiple virtual machines executing on the processor 102, with each VM "believing" that the VM has full ownership of a real hardware APD 116.

Figure 2:
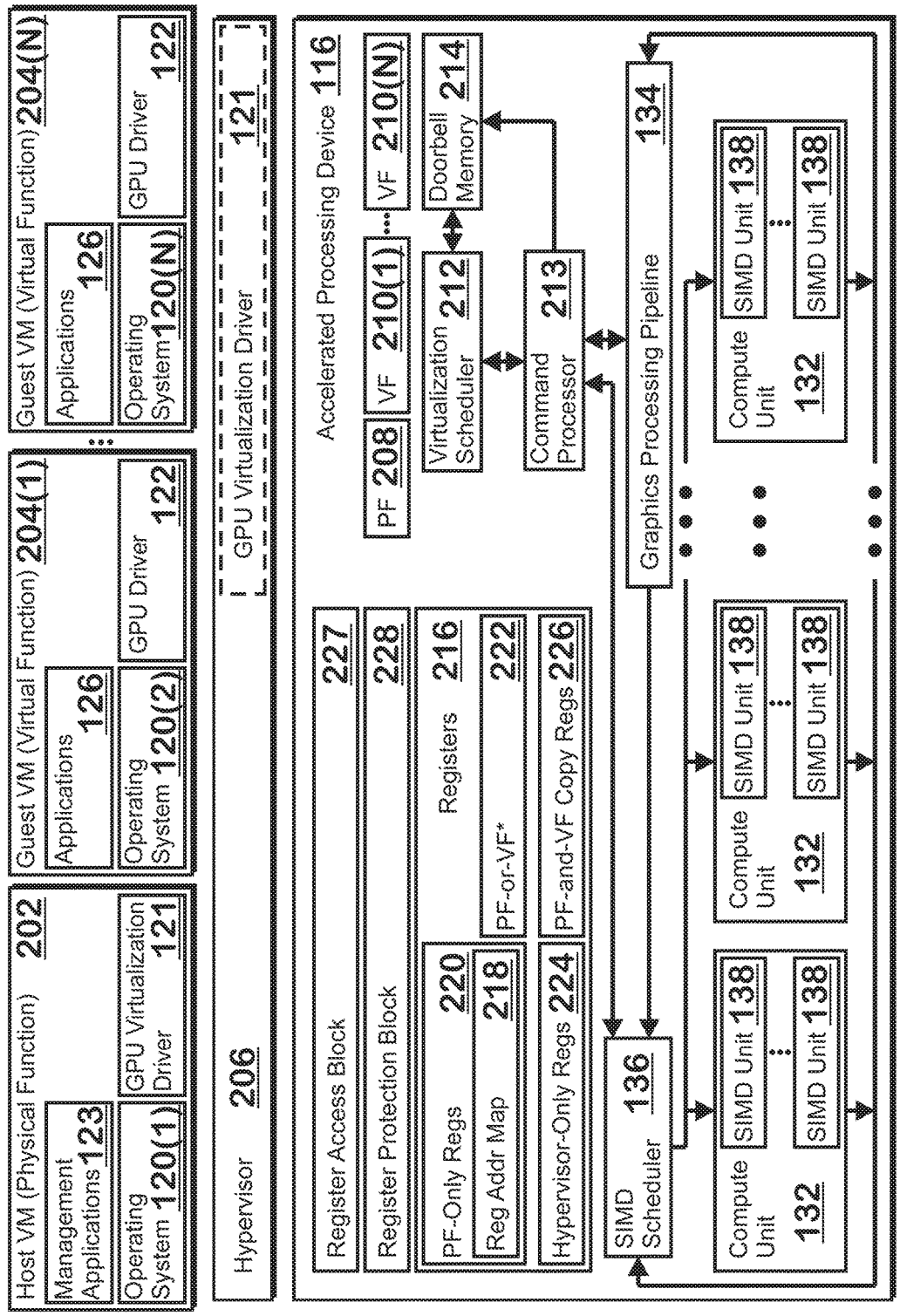
FIG. 2 is a block diagram of the device of FIG. 1, illustrating details related to virtualization, according to an example.

FIG. 2 illustrates details of the device 100 and the APD 116 related to virtualization, according to an example. The processor 102 runs a hypervisor 206 that supports multiple virtual machines. A privileged host virtual machine 202, is not a "general purpose" VM like the guest VMs 204, but instead performs support for virtualization of the APD 116 for use by the guest VMs 204. A hypervisor 206 provides virtualization support for the virtual machines, which includes a wide variety of functions such as managing resources assigned to the virtual machines, spawning and killing virtual machines, handling system calls, managing access to peripheral devices, managing memory and page tables, and various other functions.

The APD 116 supports virtualization by allowing time-based sharing of the APD 116 or subsets of the APD 116 between the virtual machines. On the APD 116, a physical function 208 is associated with a host VM 202 and one or more virtual functions 210 are associated with each guest VM 204. "Physical functions" are essentially an addressing parameter in the peripheral component interconnect express ("PCIe") standard. More specifically, physical functions allow communications involving a device coupled to a PCIe interconnect fabric to specify a particular physical function of the device so that the device is able to handle the communications according to functionality specifically assigned to that physical function. In one example, a physical function is associated with regular graphics rendering on a graphics processing device such as the APD 116. Herein, a single physical function is described, but the teachings of the present disclosure apply to APDs 116 for which more than one physical function is active.

Virtual functions are a feature of the PCIe standard that facilitates hardware virtualization and also acts as an addressing parameter in the PCIe standard. Typically, a set of virtual functions is associated with a particular physical function. Each virtual machine is assigned a different virtual function or functions, with the hypervisor 206 managing the correlation between VMs and virtual functions. This correlation between virtual functions and virtual machines is mostly true in the system of FIG. 2, except that the host VM 202 is able to access the physical function 208 as well as the different virtual functions 210. In that sense, the host VM 202 acts as a sort of "master virtual machine" for APD virtualization.

As described above, physical functions and virtual functions are addressing parameters in PCIe, where transactions made across PCIe specify or are intended for a particular virtual function and/or physical function and the processor 102 or APD 116 responds accordingly (note, some ways of addressing over PCIe do not explicitly specify a virtual function or physical function; for example, transactions over PCIe can be routed by memory address instead of explicitly by function, where the devices implicitly understand which function is associated with a particular memory address). The processor 102 directs transactions for a particular VM to the appropriate virtual function of the APD 116 via a memory mapping mechanism. More specifically, when a virtual machine makes an access to the APD 116, the memory address used to make that access is translated from a guest physical address to a system physical address. The particular system physical address used is mapped to a particular virtual function of the APD 116 by a memory mapping mechanism and thus the transaction made is routed to the APD 116 and appropriate virtual function via the mapping information.

Sharing the APD 116 among the different virtual machines is accomplished by time-dividing the operations of the APD 116 amongst the different virtual machines. A virtualization scheduler 212 performs this task, scheduling different virtual machines for operation by switching between work for the different virtual machines as the execution time assigned to the virtual machines elapse. Although the APD 116 is shared among the different virtual machines, each virtual machine perceives that it has an individual instance of a real, hardware APD 116. Although the terms "virtual function" and "physical function" refer to addressing parameters of the PCIe standard, because these functions map to different VMs, the logical instance of an APD 116 assigned to a particular virtual machine will also be referred to herein as either a virtual function or a physical function. In other words, this disclosure may use terminology such as "the virtual function performs a task," (or physical function) or "an operation is performed on of for a virtual function," (or physical function) and this terminology should be read to mean that the APD 116 performs that task for the time slice assigned to the VM associated with that particular virtual or physical function, or on behalf of the VM associated with that virtual or physical function.

The host VM 202 and the guest VMs 204 have operating systems 120. The host VM 202 has management applications 123 and a GPU virtualization driver 121. The guest VMs 204 have applications 126, an operating system 120, and a GPU driver 122. These elements control various features of the operation of the processor 102 and the APD 116.

As stated above, the host VM 202 configures aspects of virtualization in the APD 116 for the guest VMs 204. Thus the host VM 202 includes an operating system 120 that may support execution of other elements such as management applications 123 and a GPU virtualization driver 121. The GPU virtualization driver 121 may include the capabilities to render graphics in much the same way as a traditional graphics driver. One aspect that distinguishes the GPU virtualization driver 121 from a traditional graphics driver is that the GPU virtualization driver 121 also has the ability to communicate with the APD 116 to configure and control various aspects of the APD 116 for virtualization. In one example, the GPU virtualization driver 121 manages parameters related to the time-slicing mechanism for sharing the APD 116 among the different VMs, controlling parameters such as how much time is in each time slice, how switching is performed between different virtual functions, and other aspects. The GPU virtualization driver 121 may be separate from a different graphics driver that does send graphics-related commands to the APD 116 or may be incorporated into such a graphics-related driver. In other words, the virtualization-related functionality may be in a separate driver than graphics functionality or may be included in a single driver with the graphics functionality. The management applications 123 perform one or more tasks that involve data for one or more different guest VMs 204, and/or perform one or more tasks for managing virtualization. In one example, the host VM 202 performs a desktop compositing function through a management application 123, where the desktop compositing function has access to rendered frames from the different guest VMs 204 and composites those frames into a single output view.

In the example illustrated, the guest VMs 204 include an operating system 120, a GPU driver 122, and applications 126, although not all VMs 204 need each of these elements and other elements may instead be present. For example, in some implementations, some or all guest VMs 204 do not include a GPU driver 122. The operating system 120 is any type of operating system that could execute on processor 102. The GPU driver 122 is a "native" driver for the APD 116 in that the GPU driver 122 controls operation of the APD 116 for the guest VM 204 on which the GPU driver 122 is running, sending tasks such as graphics rendering tasks or other work to the APD 116 for processing. The native driver may be an unmodified or only slightly modified version of a device driver for a GPU that would exist in a bare-metal non-virtualized computing system.

Although the GPU virtualization driver 121 is described as being included within the host VM 202, in other implementations, the GPU virtualization driver 121 is included in the hypervisor 206 instead. In such implementations, the host VM 202 may not exist and functionality of the host VM 202 may be performed by the hypervisor 206. Although the GPU virtualization driver 121 is described as being included within the host VM 202, in other implementations, the GPU virtualization driver 121 may be included in a specialized guest VM.

The operating systems 120 of the host VM 202 and the guest VMs 204 perform standard functionality for operating systems in a virtualized environment, such as communicating with hardware, managing resources and a file system, managing virtual memory, managing a network stack, and many other functions. The GPU driver 122 controls operation of the APD 116 for any particular guest VM 204 by, for example, providing an application programming interface ("API") to software (e.g., applications 126) to access various functionality of the APD 116. The driver 122 also includes a just-in-time compiler that compiles programs for execution by processing components (such as the SIMD units 138 discussed in further detail below) of the APD 116. For any particular guest VM 204, the GPU driver 122 within a specific guest VM 204 controls functionality on the APD 116 related to that specific guest VM 204, and not for other VMs.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102. A command processor 213 accepts commands from the processor 102 (or another source), and delegates tasks associated with those commands to the various elements of the APD 116 such as the graphics processing pipeline 134 and the compute units 132. The VMs inform the APD 116 regarding new tasks for execution via a doorbell mechanism, using the doorbell memory 214.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

The virtualization scheduler 212 manages time-sharing of the APD 116 among the different virtual machines. In each time slice, the virtualization scheduler 212 permits work for the virtual machine associated with that time slice to proceed in the APD 116. The doorbell memory 214 stores doorbells, which are indications that work is ready to be performed on the APD 116 for a particular virtual machine. The doorbell mechanism operates asynchronously with respect to which virtual machine is currently scheduled for work on the APD 116. This means that a particular virtual machine may place a doorbell in doorbell memory 214 at a time when tasks for a VM other than the VM that placed the doorbell in the doorbell memory 214 are being executed on the APD 116.

Virtualization on the APD 116 works as follows. The virtualization scheduler 212 manages time slices on the APD 116 for the VMs (both the host VM 202 and the guest VMS 204) that share the APD 116. The virtualization scheduler 212 tracks the time slices, stopping work on the APD 116 when a time slice for a particular VM has expired and starting work for the VM having the next time slice. Thus, the virtualization scheduler 212 switches between different VMs that have work to be executed on the APD 116

To begin work for a particular time slice associated with a particular function, the virtualization scheduler 212 causes the command processor 213 to begin fetching and executing work for the function. More specifically, the command processor 213 examines a doorbell for that function, where the doorbell is a pointer into a command buffer that indicates where commands for processing are stored. The command processor 213 executes the commands indicated by the doorbell, executing those commands on the APD 116, such as in the graphics processing pipeline 134 and/or for general purpose computing work until either there are no more commands to execute or until the time slice associated with the function has expired, whichever comes first. In some implementations, when there are no more commands to execute but the time-slice has not yet expired, the virtualization scheduler may at its own discretion pre-empt the time-slice and switch to another function.

Note that the other portions of the APD 116 whose functionality is not specifically described in the context of virtualization works as described above and as if no virtualization was occurring. For example, the graphics processing pipeline 134 performs operations related to graphics rendering in response to graphics rendering commands fetched by the command processor 213. For at least some of the graphics rendering commands associated with the graphics processing pipeline 134, and/or for the general purpose compute operation, SIMD scheduler 136 generates and manages wavefronts for execution on the SIMD units 138 of the compute units 132 in accordance with the commands processed by the command processor 213. In an example a command is a command to render a particular piece of geometry using, among other facilities of the graphics processing pipeline 134, a particular pixel shader program. The graphics processing pipeline 134 processes the geometry through the various stages of the graphics processing pipeline 134, such as the input assembler stage 302, hull shader stage 306, tessellator stage 308, and so on, and at the pixel shader stage 316, causes the geometry to be processed with a specific pixel shader, on the SIMD units 138. The SIMD scheduler 136, manages and schedules the wavefronts for the pixel shader for execution.

Figure 3:
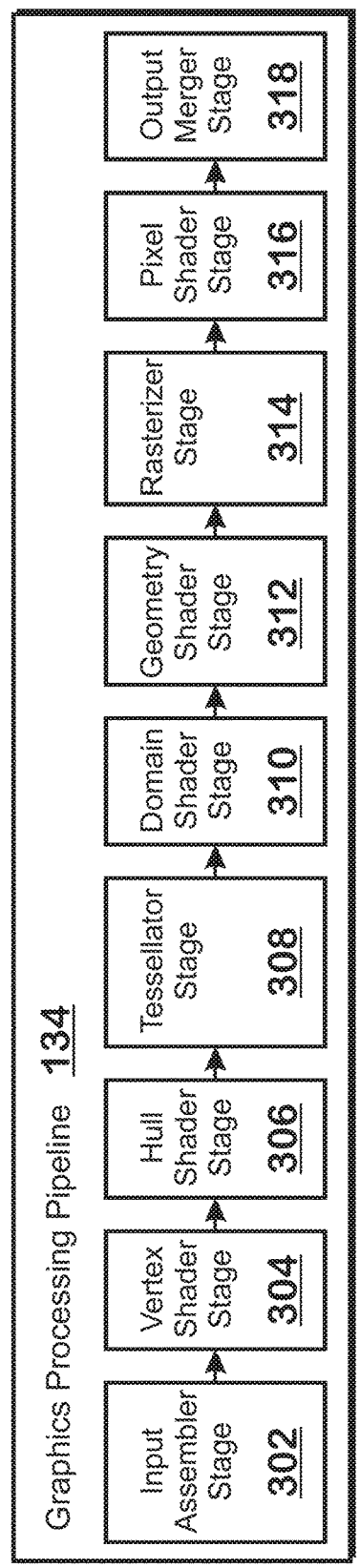
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality. The stages represent subdivisions of functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertexes of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations. Herein, such transformations are considered to modify the coordinates or "position" of the vertices on which the transforms are performed. Other operations of the vertex shader stage 304 modify attributes other than the coordinates.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132.

The geometry shader stage 312 performs vertex operations on a primitive-by-primitive basis. A variety of different types of operations can be performed by the geometry shader stage 312, including operations such as point sprint expansion, dynamic particle system operations, fur-fin generation, shadow volume generation, single pass render-to-cubemap, per-primitive material swapping, and per-primitive material setup. In some instances, a shader program that executes on the compute units 132 performs operations for the geometry shader stage 312.

The rasterizer stage 314 accepts and rasterizes simple primitives and generated upstream. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a shader program that executes on the compute units 132.

The output merger stage 318 accepts output from the pixel shader stage 316 and merges those outputs, performing operations such as z-testing and alpha blending to determine the final color for a screen pixel.

Referring back to FIG. 2, when the virtualization scheduler 212 determines that the time slice for the VM having work currently executing on the APD 116 has expired, the virtualization schedulers causes the APD 116 to complete that work without accepting any new work (e.g., does not accept new tasks pointed to by a doorbell stored in the doorbell memory 214 but completes the tasks already "in flight" in the graphics processing pipeline 134 and/or compute units 138). Completing the tasks involves allowing the work currently in-flight in the APD 116 to complete and to have final output values written out to the target memory location. For example, for graphics rendering, output pixels would be written to the frame buffer (or other render target). (Note, stalls may occur in which work currently executing in the APD 116 either does not complete or takes an exceedingly long time to complete). The virtualization scheduler 212, GPU virtualization driver 121, management applications 123 in the host VM 202, and/or another entity may work independently or cooperate to handle stalls.

After work has completed for a particular function, or the time slice for the function has expired, the virtualization scheduler 212 moves on to the time slice for the next function, causing the command processor 213 to fetch tasks for that function based on the contents of the doorbell memory 214, and to execute those tasks on the graphics processing pipeline 134 and/or in the compute units 132 directly (e.g., for general purpose computing). This process of stopping execution of work for a time slice that has expired and starting work for the next function continues to provide time-sharing of the APD 116 to the different VMs.

The change between execution of work for one function and execution of work for another function is referred to as a "world switch" herein. A world switch comprises stopping a current function (which may or may not include some latencies), saving the state of the current function, loading of the next function to execute, setting the active function identifier to that next function and running the next function. Generally, state includes values stored throughout or for the APD 116 that manage aspects of the workflow executed for the APD 116. In various examples, state may include values stored in registers (e.g., registers 216) that control how graphics is rendered, how SIMD work is executed, how shaders are executed, and control various other aspects of operations on the APD 116. Saving state involves writing the state from an in-use (or "active") location (where the state values actually have effect on the operation of the APD 116) to a save state location for the function. Loading state involves loading the state from the save state location for the function to the in-use (or "active") location.

Various registers 216 exist in the APD 116 and allow for adjustment of a variety of configuration parameters. The registers 216 are accessed via a memory mapping mechanism. More specifically, a register address map 218 indicates the manner in which memory accesses in an address space utilized for communication over the PCIe interface, such as the system physical address space, map to physical memory addresses in the APD 116 at which the registers are accessed. The system physical address space is the memory space visible to the hypervisor 206 and to the host virtual machine 202 and is essentially the main physical address space of the device 100. A guest physical address space is the virtualized "physical" address space as "seen" by a particular guest VM 204. In other words, to a guest VM 204, a guest physical address space appears to be the actual physical address space. A third address space—guest virtual memory—represents the typical virtual memory address space that would exist in computer systems, but that exists in the virtualized environment of a VM. Mappings between the system physical address space and the guest physical address space are managed by the hypervisor 206 and mappings between the guest virtual address space and the guest physical address space are managed by the operating systems 120 although other parts of the device 100 (such as hardware-based page table walkers, translation caches, or other elements) may be involved in managing mappings between the different address spaces. Although the register address map 218 is illustrated as being within register 216, the register address map 218 may be only partially defined by registers 216, with those partial definitions being used in combination with other mapping information that further define the register address mapping.

Various registers 216 are differentiated based on the entity or entities that are permitted to access the registers 216. More specifically, the registers 216 are designated as being physical function only registers 220, physical function or virtual function registers 222, hypervisor only registers 224, or physical function and virtual function copy registers 226. Physical function only registers 220 are accessible by the physical function (host VM 202 or GPU virtualization driver 121 in the implementation in which the GPU virtualization driver 121 executes in the hypervisor 206) and not by any of the guest VMs 204. Physical function or virtual function registers ("PF-or-VF* registers") 222 are accessible by either the physical function 202 or the virtual functions 204. Hypervisor only registers 224 are accessible only by the hypervisor 206. Physical function and virtual function copy registers 226 are special registers for which a copy is maintained for each function. These registers are independent in that the registers are at different memory addresses and store different unrelated values. The purpose of the physical function and virtual function copy registers 226 is to relieve the burden of saving and loading state for certain registers. More specifically, as described above, when a world switch occurs, state, including registers values, is saved and loaded. This saving and loading consumes computing resources, thereby increasing overhead involved with performing the world switch. To reduce this overhead, some registers are designated as physical function and virtual function copy registers 226, which removes the need to save and load the values of those registers. Physical function and virtual function copy registers can be accessed at any time regardless of which function is the active function. The PF-or-VF* registers 222 are contrasted with other register types in that, for PF-or-VF* registers 222, a single "architectural" register exists, with the value for that register being changed to the value associated with a specific function when the specific function becomes the active function during a world switch. More specifically, for PF-or-VF* registers 222, when a world switch occurs, the APD 116 saves the value of PF-or-VF* registers in state backup memory for the current function (the function being switched out) and loads the value for the next function into that register. The register can be said to be a "shared architectural register" in that there is only one memory location—the architectural register—that actively acts as a register, and that this memory location is shared between the different functions in that the register values are saved and restored during a world switch. Even though the memory location is shared between different functions, the value that is stored in the memory is unique or specific to the function that is the current active function. As each different function becomes the active function, the data value at this memory location will be changed to reflect the data value that the specific active function expects to "see" in this memory location. Functions do not "see" the data values for other functions. This is contrasted with the PF-and-VF* copy registers 226, for which multiple memory location exist for each register, with each of the memory locations acting as the same register for a different function, and which therefore does not require the saving and reloading associated with the PF-or-VF* registers 222. PF-or-VF* registers can be accessed by the VM at any time regardless of which function is the current active function.

In some implementations, virtual machines are able to directly access registers 216. Direct access to registers means that a VM provides a request to read or write to a memory address that maps to a register of the APD 116 and the APD 116 reads or writes to that register. More specifically, a VM provides an address and access type (e.g., read or write) over the PCIe bus to the APD 116. The register access block 227 looks up the address in the register address map 218, determines that the address corresponds to a register of the registers 216 and causes a register access corresponding to the access type to occur. The register protection block 228 prevents such an access from occurring if the register access is made by a VM via a function that does not currently "own" the register being accessed. A function "owns" the register if the register is of type PF-and-VF* copy or if the register is a PF-or-VF* register 222 and the function is the current active function. PF-only registers are "owned" by the physical function when the physical function is the current active function.

Indirect access using the doorbell memory 214 and command processor 213 means that the VM provides one or more commands to the APD 116, via the doorbell mechanism, where the commands include (or involve/cause) an access to one or more of the registers 216. The doorbell memory 214 stores a pointer to commands in system memory and the command processor 213 causes those commands to be fetched for processing by the graphics processing pipeline 134 and/or by the compute units 132 for general purpose GPU computing when the VF associated with the VM becomes the current active function. Some of those commands may cause accesses to registers to occur.

Figure 4:
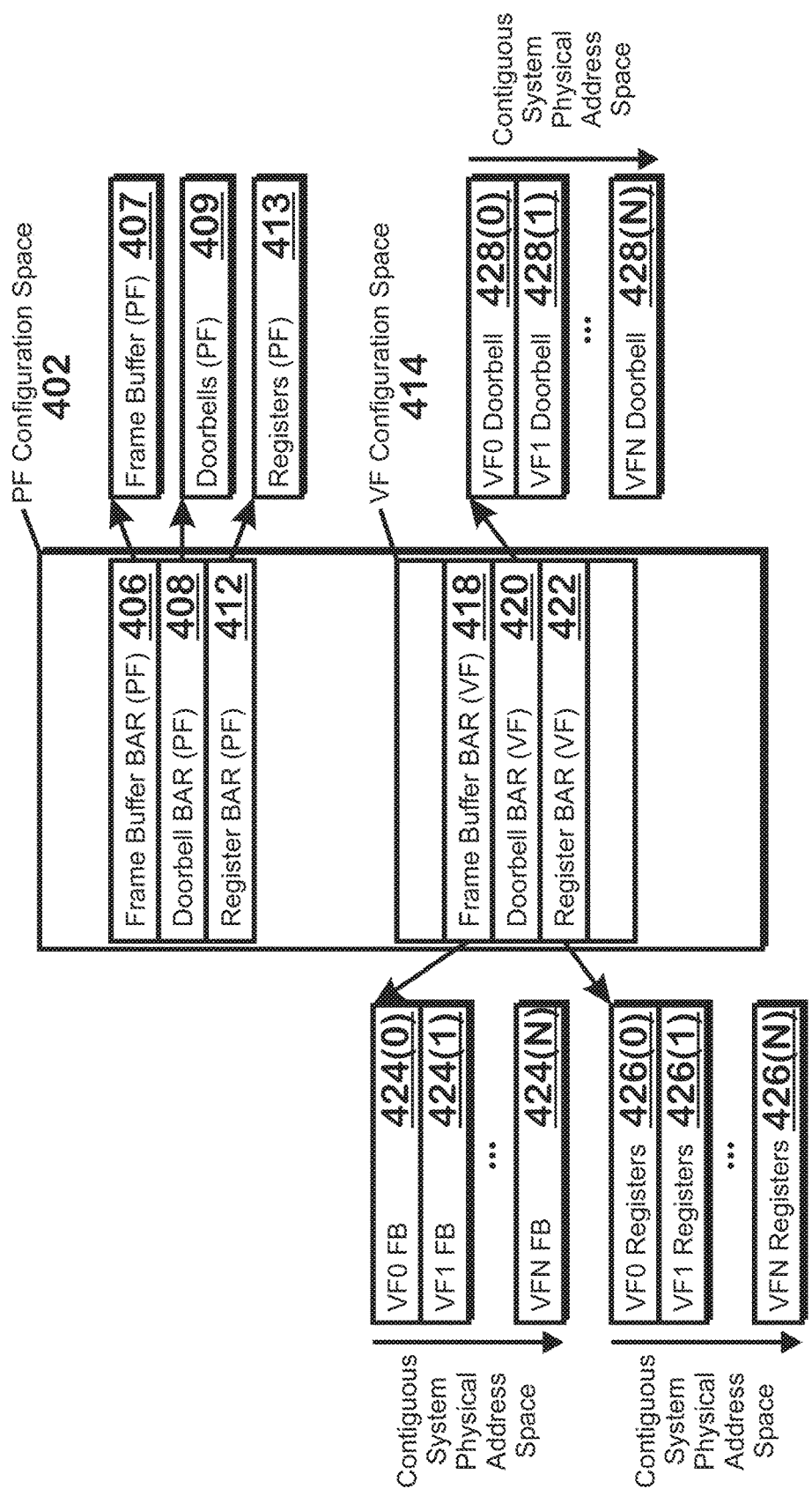
FIG. 4 illustrates details related to protection of PF-or-VF* registers, according to an example.

As described above, a register protection block 228 prevents or allows access to the registers 216 depending on which protection category a register belongs in and which entity is making the particular access. FIG. 4 illustrates details related to protection of PF-or-VF* registers, according to an example. More specifically, FIG. 4 illustrates a portion of the PCIe physical function ("PF") configuration space 402 for the physical function associated with the virtual functions for the different VMs that share the APD 116. The PF configuration space 402 includes a frame buffer base address register ("BAR") 406, a doorbell BAR 408, a register BAR 412, and a VF configuration space 414. The VF configuration space 414 includes a frame buffer BAR 418, a doorbell BAR 420, and a register BAR 422. The PF configuration space 402 may include other elements not illustrated.

The frame buffer BAR (PF) 406 specifies the system physical address for the frame buffer for the physical function—pointing to a frame buffer 407 for the physical function. The doorbell BAR (PF) 408 specifies the system physical address for the doorbells 409 for the physical function. The register BAR (PF) 412 specifies the system physical address for the registers 413 for the physical function. These registers include: the PF-only registers 220, at least some registers of the PF-or-VF* registers 222, and at least some registers of the PF-and-VF* copy registers 226, but not the hypervisor-only registers 224 (alternatively, the hypervisor-only registers 224 may be in the registers 413 but may not be accessible to the virtual functions or may be only read-accessible to the virtual functions). Note that the specified system physical addresses serve to specify how (i.e., using which address) entities within the device 100 communicate with the particular items associated with the system physical address but do not specify where those items are actually physically stored (whether in memory in the APD 116 or in some other memory). The location of the actual storage of such elements may be fixed or programmable, for example, by other registers not discussed herein. It is the job of some logic (whether hardware or software) to direct accesses that fall into a window specified by a particular base address register to the associated actual memory location.

Within the VF configuration space 414, the frame buffer BAR 418 specifies a system physical address that begins a contiguous range of system physical addresses that includes the frame buffer apertures 424 for each of the virtual functions. For example, if each frame buffer aperture 424 is 64 megabytes in size, then the frame buffer aperture 424(0) for the first virtual function starts at the address specified by the frame buffer BAR 418, the frame buffer aperture 424(1) for the second virtual function starts at that address+64 MB, the frame buffer aperture 424(2) for the third virtual function starts at that address+128 MB, and so on. Similarly, the doorbell BAR (VF) 420 specifies the starting system physical address for a contiguous section of doorbell locations for different VFs and the register BAR (VF) 422 specifies the starting system physical address for a contiguous section of register locations for different VFs. Thus, the address specified by the doorbell BAR (VF) 420 specifies the beginning address of the section 428(0) of system physical memory allotted to doorbells for the first VF, which is followed contiguously in system physical memory by a section 428(1) of system physical memory allotted to registers for the second VF, and so on, and the address specified by the register BAR (VF) 422 specifies the beginning address of the section 426(0) of the system physical memory address space allotted to registers for the first VF, which is followed contiguously in the system physical memory address space by a section 426(1) of physical memory allotted to registers for the second VF, and so on. Note that, as described above, the register BAR (VF) 422 specifies the system physical address for the registers that "belong" to the virtual functions, but does not specify the actual storage location of those registers within the APD 116 itself. Instead, the register access block 227 or other element translates an offset within a particular register section 426 to a particular physical memory location that stores particular registers. In one illustrative non-limiting example of the manner in which particular registers map to particular address ranges, the register access block 227 translates the first 1024 bytes after the system physical memory address corresponding to VF0 registers 426(0) to registers for the pixel shader stage 316, translates the second 1024 bytes after the system physical memory address corresponding to VF0 registers 426(0) to registers for the rasterizer stage 312, and so on. In this way, the base address registers, including the register BAR (VF) 422 and register BAR (PF) 412, act as part of a memory mapping mechanism, mapping addresses in system physical address to individual registers associated with the APD 116.

Because the registers pointed to by the register BAR (VF) 422 "belong" to the virtual functions, at least some of these registers are considered to be PF-or-VF* registers. Further, at least some of the registers referenced by the register BAR (PF) 412 are PF-or-VF* registers, while other such registers are PF-only registers. At least some of the registers referenced by the register BAR (PF) 412 and register BAR (VF) 422 are PF-and-VF* copy registers. Hypervisor-only registers are not referred to by any of the BARs illustrated in FIG. 4, but no such registers are permitted to be accessed by the PF or the VF (e.g., by the host VM 202 or guest VMs 204 of FIG. 2).

The register protection block 228 prevents accesses to registers by a VM or a function that is not permitted to access those registers. The register protection block 228 has access to information that indicates which protection category (i.e., hypervisor-only, PF-or-VF*, PF-and-VF* copy, or PF-only) the registers referenced by the register BAR (PF) 412 and the register BAR (VF) 422 belong to. For hypervisor only registers, if accesses to such registers are attempted to be made by a VM, the register protection block 228 prevents such accesses. Note that herein, where a particular access is said to be prevented or not allowed, it may be the case that reads are allowed and writes are disallowed, or it may be the case that both reads and writes are disallowed. For PF-and-VF* copy registers, such registers are not protected. Instead, because each VF and the PF has a copy of such registers, the register access block 227 simply forwards the access to a PF-and-VF* copy register to the appropriate copy of that particular register, based on which function (physical function or virtual function) the access is being made for. For PF-only registers, if a request to access those registers comes from a VM via a virtual function, then the register protection block 228 disallows such accesses.

The register protection block 228 also prevents guest VMs 204 associated with one virtual function from accessing PF-or-VF* registers not associated with that virtual function. The protection mechanism for PF-or-VF* registers is now defined with reference to FIGS. 4 and 5 together.

Figure 5:
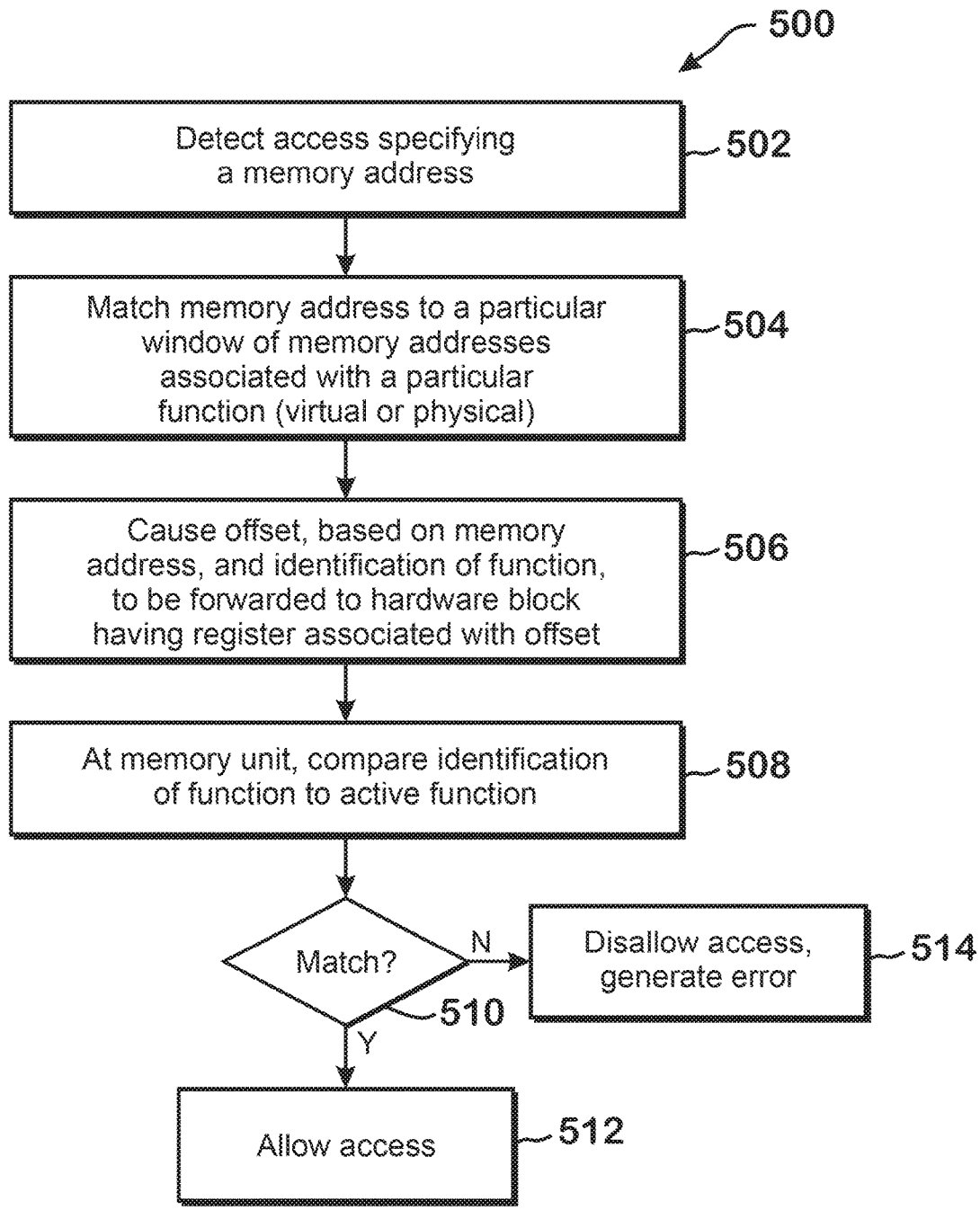
FIG. 5 is a flow diagram of a method for mediating access to PF-or-VF* registers, according to an example.

FIG. 5 is a flow diagram of a method 500 for mediating access to PF-or-VF* registers 222, according to an example. Although described with respect to the system of FIGS. 1-4, it should be understood the method 500, performed by any system, with steps as illustrated or in any other technically feasible order, falls within the scope of the present disclosure.

The method 500 begins at step 502, where the register access block 227 receives a memory access request. In various examples, the memory access comprises a transaction over an interconnect bus such as a PCIe bus that specifies a particular memory address and a particular memory access type, such as read or write. The address received is in the system physical address space, having been translated after being generated by a VM. For example, if a GPU driver 122 on a guest VM 204 generated the address, then that address would be in the guest physical address and would be translated to the system physical address by an appropriate mechanism (such as a page table walker or address translation cache). If an application 126 in a guest VM 204 generated the address, then the address would be translated from a guest virtual address space to a system physical address space. At step 504, the register access block 227 checks the address provided in the request against the addresses specified by the register BAR (VF) 422 and the register bar (PF) 412. If there is a match, then the register access block 227 determines that the access request is a request to access a register.

At step 506, the register access block 227 determines an offset for the address. The offset is a collection of least significant bits of the address that specify a position within the system physical memory address space that belongs to the VF registers 426. The register access block 227 also determines which function (i.e., which virtual function or the physical function) the access request is directed to by comparing the address specified by the request to the range of addresses assigned to each function (e.g., the range specified as registers (PF) 413 or any of the ranges specified as VF registers 426(0) through VF registers 426(N)).

At step 508, the register access block 227 causes the function identifier and the offset to be forwarded to the hardware block having the register associated with the offset. As described above, the register access block 227 has access to information that specifies which offset range is assigned to which specific registers, or at least has access to information that indicates which hardware unit should receive register accesses for registers identified by specific offsets. Thus the register access block 227 is able to forward the offset and function identifier to the appropriate part of the APD 116 for processing and eventual register access.

At step 508, the memory unit—that is, the hardware block having the register, or some unit that supports that hardware block—compares the identification of the function (which was based on the original address received) to the active function on the APD 116—i.e., the function whose time slice currently has work being performed. Also at step 508, the memory unit identifies the protection category (e.g., PF-or-VF*, PF-and-VF* copy, or the like), and skips to step 512 if the protection category is not PF-or-VF*. At step 510, if the identified function does not match the current function, then the method 500 proceeds to step 514, where the register access is dropped because the register access would be made for the wrong function. At step 514, the "error" of an improper register access is handled by either or both of: logging that the error occurred; and sending a signal (e.g., an interrupt) to a security processor that can handle the error in any technically feasible manner (e.g., informing the processor 102, stopping execution for a particular function, and/or any other technically feasible technique). At step 510, if the identified function does match the current function, then the method 500 proceeds to step 512, where the register access is allowed. The unit that performs the match check (e.g., steps 508-510) is the register protection block 228 of FIG. 2, which can be embodied as any combination of hardware and software executing on appropriate hardware associated with the APD 116, and can also be considered to be a collection of different hardware and/or software modules distributed throughout the APD 116 and associated with the different hardware blocks that are associated with the different registers referred to by the register BAR (PF) 412 and/or register BAR (VF) 422. For instance, each unit (or more than one unit) that "owns" different registers of the registers referred to by the register BAR (PF) 412 and/or register BAR (VF) 422 may have its own logic that compares the forwarded function identifier to the currently active function and allows or disallows the memory accesses based on that comparison as described above.

Checking against the active function makes sense because of the manner in which requests to access registers are performed. More specifically, there are two "modes" in which registers register accesses can be made. The first mode, termed an "initialization" or "exclusive" mode, occurs when a VM starts up. More specifically, upon startup, a VM has exclusive access to the APD 116 to perform initialization functions such as setting registers. Thus, an access to a register for a particular VM would occur at the same time that the VM has a "time slice" on the APD 116. The second mode is normal operation. In normal operation, VMs are not expected to directly access registers in the APD 116 via direct reads or writes over the PCIe bus to memory locations mapped to APD registers 116. Instead, register accesses occur through the doorbell mechanism, in which a VM writes a command to a command buffer associated with the doorbell, and in which the APD 116 reads a doorbell and executes the specified commands for a particular VM when the time slice for that VM is active. In other words, a command that would result in a modification to a register would be executed during the time slice for the VM that issued that command. In either of the above modes, if the identified function does not match the current function, then some kind of error occurred, resulting in a particular function attempting to read or write a register that belongs to a different function.

Note, while the address included in the request provided by a particular VM to access a register includes information that identifies a particular virtual function (i.e., the portion of the address that specifies one of the address ranges corresponding to one of VF registers 426), the offset generated by the register access block 227 does not include information that specifies a particular function. Thus, the offset refers generically to specific registers, as opposed to both a specific register and a function. As described above, in the APD 116, sharing registers classified as PF-or-VF* registers is accomplished using a save-state and reload mechanism. According to this mechanism, the function whose time slice is ending saves the values of PF-or-VF* registers in a backup memory and the function whose time slice is beginning restores the value for that function to the PF-or-VF* registers. In this mechanism, only a single copy of each PF-or-VF* register exists, with the register values for non-active functions being stored in a backup memory. Thus, if only the offset were used, without considering the function identifier provided by the register access block 227, then one function could potentially overwrite registers of another function. The register protection block 228 and protection mechanism consisting of checking the function identified by the register access block 227 against the current function prevents this type of overwrite. Note also that this protection is not used for PF-and-VF* copy registers, because there exists an individual register for each of the functions. The pf-only registers and the hypervisor-only registers are protected by a different mechanism that does not involve a register protection block 228 verifying the function associated with a particular memory access request with the current function.

It should be understood that many variations are possible based on the disclosure herein. Although features and elements are described above in particular combinations, each feature or element can be used alone without the other features and elements or in various combinations with or without other features and elements. In one example, the virtualization-related register protection mechanisms described above are described in the context of an APD 116 that includes a graphics processing pipeline 134, compute units 132, and the like. However, the virtualization-related register protection mechanisms described herein may also be used for processing devices other than processing devices that include capabilities similar to the APD 116. In an example, the mechanisms virtualization-related register protection mechanisms are applied to a multimedia device that encodes video based on a codec such as the H.265 codec. Any other processing device that performs processing in a virtualized manner (in which multiple virtual machines share the processing device through a physical function and virtual function mechanism) may have registers protected in accordance with the description herein. The term "virtualization-enabled processing device" as used herein refers to an APD 116 or any other processing device that is virtualization-enabled (is time-shared among different VMs) and has registers that can be protected according to the mechanisms herein. It should be recognized, however, that the term processing device can be read to exclude the processor 102 (i.e., a processor that runs an operating system and/or hypervisor that generally directs operations of the device 100) or other "central processing unit" type processors that directs operations of the device 100 and/or runs applications on top of such operating systems.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for protecting a register for a virtualization-enabled processing device, the method comprising:
   receiving a request to access the register of the virtualization-enabled processing device, the register being time-shared among functions in a virtualization scheme such that a different function owns the register during a different time-slice of the virtualization scheme, wherein a function that owns a register is a function that is permitted to access the register;
   analyzing an address specified by the request to obtain a requester function identifier and an offset;

identifying a hardware unit having the register based on the offset;

forwarding the requester function identifier and the offset to the hardware unit having the register;

determining that the requester function identifier and an active function identifier indicate different functions, wherein the active function identifier indicates which function is currently active on the virtualization-enabled processing device, wherein a function that is currently active is a function whose time slice currently has work being performed; and, in response to the determining, preventing the access to the register from occurring for the currently active function, the access including the currently active function reading from or writing to the register.

2. The method of claim 1, further comprising:

receiving a second request to access the register;

analyzing a second specified by the second request to obtain a second requester function identifier and a second offset;

identifying a second hardware unit having the second register based on the second offset;

forwarding the second requester function identifier and the second offset to the second hardware unit having the second register;

determining that the second requester function identifier and the second active function identifier indicate the same function; and in response, allowing the second access to the second register to occur.

3. The method of claim 1, further comprising:

determining that a time-slice for a first function has ended and that a time slice for a second function is to be started; and responsive to the determining, saving a value stored in the register for the first function to a first backup memory for the first function and loading a value from a second backup memory for the second function to the register.

4. The method of claim 3, wherein the register comprises:

a register that is used for operations of a physical function of the functions of the virtualization scheme or of virtual functions of the functions of the virtualization scheme.

5. The method of claim 1, wherein analyzing the address specified by the request to obtain the requester function identifier and the offset comprises:

identifying which address range, of a set of address ranges, the address specified by the request falls within; and identifying the requester function identifier as the function identifier assigned to the identified address range, according to a register access block.

6. The method of claim 1, wherein:

identifying the hardware unit associated with the register based on the offset is performed without considering the function identifier.

7. The method of claim 1, wherein the receiving, analyzing, identifying, forwarding, and comparing are performed while a virtual machine associated with the function that is currently active is permitted to directly access registers, including the register, via a system physical memory address.

8. The method of claim 1, wherein the receiving, analyzing, identifying, forwarding, and comparing is performed via a doorbell mechanism.

9. A virtualization-enabled processing device, comprising:

a register access circuit configured to:

receive a request to access a register of the virtualization enabled processing device, the register being time-shared among functions in a virtualization scheme such that a different function owns the register during a different time-slice of the virtualization scheme, wherein a function that owns a register is a function that is permitted to access the register, analyze an address specified by the request to obtain a requester function identifier and an offset, identify a hardware unit having the register based on the offset, and forward the requester function identifier and the offset to the hardware unit having the register; and a register protection circuit configured to:

determine that the requester function identifier and an active function identifier indicate different functions, wherein the active function identifier indicates which function is currently active on the virtualization enabled processing device, wherein a function that is currently active is a function whose time slice currently has work being performed; and in response to the determining, prevent the access to the register from occurring for the currently active function, the access including the currently active function reading from or writing to the register.

10. The virtualization enabled processing device of claim 9, wherein:

the register access circuit is further configured to:

receive a second request to access the register;

analyze a second address specified by the second request to obtain a second requester function identifier and a second offset;

identify a second hardware unit having the second register based on the second offset;

forward the second requester function identifier and the second offset to the second hardware unit, having the second register; and the register protection circuit is further configured to:

determine that the second requester function identifier and the active function identifier indicate the same function; and in response, allow the second access to the second register to occur.

11. The virtualization enabled processing device of claim 9, further comprising a virtualization scheduler configured to:

determine that a time-slice for a first function has ended and that a time slice for a second function is to be started; and responsive to the determining, save a value stored in the register for the first function to a first backup memory for the first function and loading a value from a second backup memory for the second function to the register.

12. The virtualization enabled processing device of claim 11, wherein the register comprises:

a register that is used for operations of a physical function of the functions of the virtualization scheme or of virtual functions of the functions of the virtualization scheme.

13. The virtualization enabled processing device of claim 9, wherein the register access circuit is configured to analyze the address specified by the request to obtain the function identifier and the offset by:

identifying which address range, of a set of address ranges, the address specified by the request falls within; and identifying the requester function as the function identifier assigned to the identified address range, according to a register access circuit.

14. The virtualization enabled processing device of claim 9, wherein the register access circuit is configured to identify the hardware unit associated with the register by without considering the function identifier.

15. The virtualization enabled processing device of claim 9, wherein the operations of receiving, analyzing, identifying, forwarding, and comparing are performed while a virtual machine associated with the function that is currently active is permitted to directly access registers, including the register, via a system physical memory address.

16. The virtualization enabled processing device of claim 9, wherein the operations of receiving, analyzing, identifying, forwarding, and comparing is performed via a doorbell mechanism.

17. A method for protecting a register for a virtualization enabled processing device, the method comprising:
receiving a request to access the register of the virtualization-enabled processing device, the register being time-shared among functions in a virtualization scheme such that a different function owns the register during a different time-slice of the virtualization scheme, wherein a function that owns a register is a function that is permitted to access the register;
analyzing an address specified by the request to obtain a requester function identifier and an offset;
identifying a hardware unit having the register based on the offset;
forwarding the requester function identifier and the offset to the hardware unit having the register;
determining that the requester function identifier and an active function identifier indicate the same function, wherein the active function identifier indicates which function is currently active on the virtualization-enabled processing device, wherein a function that is currently active is a function whose time slice currently has work being performed; and
in response to the determining, allowing the access to the register to occur for the currently active function, the access including the currently active function reading from or writing to the register.

18. The method of claim 17, further comprising:
receiving a second request to access the register;
analyzing a second address specified by the second request to obtain a second requester function identifier and a second offset;
identifying a second hardware unit having the second register based on the second offset;
forwarding the second requester function identifier and the second offset to the second hardware unit having the second register;
determining that the second requester function identifier and the second active function identifier indicate different functions; and
in response, preventing the second access to the second register from occurring.

19. The method of claim 17, further comprising:
determining that a time-slice for a first function has ended and that a time slice for a second function is to be started; and
responsive to the determining, saving a value stored in the register for the first function to a first backup memory for the first function and loading a value from a second backup memory for the second function to the register.

20. The method of claim 19, wherein the register comprises:
a register that is used for operations of a physical function of the functions of the virtualization scheme or of virtual functions of the functions of the virtualization scheme.

21. The method of claim 17, wherein analyzing the address specified by the request to obtain the requester function identifier and the offset comprises:
identifying which address range, of a set of address ranges, the address specified by the request falls within; and
identifying the requester function identifier as the function identifier assigned to the identified address range, according to a register access block.

22. The method of claim 17, wherein:
identifying the hardware unit associated with the register based on the offset is performed without considering the function identifier.

23. The method of claim 17, wherein the receiving, analyzing, identifying, forwarding, and comparing are performed while a virtual machine associated with the function that is currently active is permitted to directly access registers, including the register, via a system physical memory address.

24. The method of claim 17, wherein the receiving, analyzing, identifying, forwarding, and comparing is performed via a doorbell mechanism.

25. A virtualization-enabled processing device, comprising:
a register access circuit configured to:
receive a request to access a register of the virtualization enabled processing device, the register being time-shared among functions in a virtualization scheme such that a different function owns the register during a different time-slice of the virtualization scheme, wherein a function that owns a register is a function that is permitted to access the register,
analyze an address specified by the request to obtain a requester function identifier and an offset,
identify a hardware unit having the register based on the offset, and
forward the requester function identifier and the offset to the hardware unit having the register; and
a register protection circuit configured to:
determine that the requester function identifier and an active function identifier indicate the same function, wherein the active function identifier indicates which function is currently active on the virtualization-enabled processing device, wherein a function that is currently active is a function whose time slice currently has work being performed; and
in response to the determining, allow the access to the register to occur for the currently active function, the access including the currently active function reading from or writing to the register.

26. The virtualization enabled processing device of claim 25, wherein:
the register access circuit is further configured to:
receive a second request to access the register;
analyze a second address specified by the second request to obtain a second requester function identifier and a second offset;

identify a second hardware unit having the second register based on the second offset;

forward the second requester function identifier and the second offset to the second hardware unit having the second register; and the register protection circuit is further configured to:

determine that the second requester function identifier and the active function identifier indicate different functions; and in response, prevent the second access to the second register from occurring.

27. The virtualization enabled processing device of claim 25, further comprising a virtualization scheduler configured to:

determine that a time-slice for a first function has ended and that a time slice for a second function is to be started; and responsive to the determining, save a value stored in the register for the first function to a first backup memory for the first function and loading a value from a second backup memory for the second function to the register.

28. The virtualization enabled processing device of claim 27, wherein the register comprises:

a register that is used for operations of a physical function of the functions of the virtualization scheme or of virtual functions of the functions of the virtualization scheme.

29. The virtualization enabled processing device of claim 25, wherein the register access circuit is configured to analyze the address specified by the request to obtain the function identifier and the offset by:

identifying which address range, of a set of address ranges, the address specified by the request falls within; and identifying the requester function as the function identifier assigned to the identified address range, according to a register access circuit.

30. The virtualization enabled processing device of claim 25, wherein the register access circuit is configured to identify the hardware unit associated with the register by without considering the function identifier.

31. The virtualization enabled processing device of claim 25, wherein the operations of receiving, analyzing, identifying, forwarding, and comparing are performed while a virtual machine associated with the function that is currently active is permitted to directly access registers, including the register, via a system physical memory address.

32. The virtualization enabled processing device of claim 25, wherein the operations of receiving, analyzing, identifying, forwarding, and comparing is performed via a doorbell mechanism.

* * * * *